(12) United States Patent
Young et al.

(10) Patent No.: US 11,271,752 B2
(45) Date of Patent: Mar. 8, 2022

(54) AUTOMATIC FORM COMPLETION FROM A SET OF FEDERATED DATA PROVIDERS

(71) Applicant: International Business Machines Corporation, Armonk, NY (US)

(72) Inventors: Richard A. Young, Johannesburg (ZA); Ashley D. Gritzman, Johannesburg (ZA); Toby Kurien, Midrand (ZA); Naweed Aghmad Khan, Johannesburg (ZA); Ismail Yunus Akhalwaya, Emmarentia (ZA)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 16/524,991

(22) Filed: Jul. 29, 2019

(65) Prior Publication Data
US 2021/0036865 A1 Feb. 4, 2021

(51) Int. Cl.
| | |
|---|---|
| *H04L 29/06* | (2006.01) |
| *H04L 9/32* | (2006.01) |
| *G06F 21/31* | (2013.01) |
| *H04L 9/08* | (2006.01) |
| *H04L 9/30* | (2006.01) |
| *G06F 40/174* | (2020.01) |
| *G06F 3/0482* | (2013.01) |

(52) U.S. Cl.
CPC ............ *H04L 9/3247* (2013.01); *G06F 21/31* (2013.01); *G06F 40/174* (2020.01); *H04L 9/088* (2013.01); *H04L 9/30* (2013.01); *G06F 3/0482* (2013.01)

(58) Field of Classification Search
CPC ......... H04L 9/3247; H04L 9/30; H04L 9/088; G06F 40/174; G06F 21/31; G06F 3/0482
See application file for complete search history.

(56) References Cited

U.S. PATENT DOCUMENTS

| | | | |
|---|---|---|---|
| 7,426,496 B2 * | 9/2008 | Kristjansson | ......... G06F 40/174 706/10 |
| 7,707,487 B2 * | 4/2010 | Easter | ................... G06F 40/174 715/225 |
| 8,109,435 B2 | 2/2012 | Mayo et al. | |
| (Continued) | | | |

OTHER PUBLICATIONS

"Homomorphic encryption", Wikipedia, last edited on Jul. 22, 2019, 9 pages https://en.wikipedia.org/wiki/Homomorphic_encryption.

*Primary Examiner* — Hosuk Song
(74) *Attorney, Agent, or Firm* — Scully, Scott, Murphy & Presser, P.C.; Shimon Benjamin (57) ABSTRACT

One or more application forms can be hosted, which application forms are received from a service provider, the service provider having been authenticated by at least one data custodian of a set of data custodians. One or more application forms include at least form fields to be populated with information. A user selection of an application form to be automatically populated can be received, the user having been authenticated by at least one data custodian of the set of data custodians. Data request is sent to at least one data custodian of the set of data custodians for automatically populating at least some of the form fields. Received data from said at least one data custodian can be collated and used to populate one or more form fields. The populated form fields can be returned to the service provider, for instance, provided a minimum requirement is met.

20 Claims, 6 Drawing Sheets

(56) References Cited

U.S. PATENT DOCUMENTS

| | | | |
|---|---|---|---|
| 9,087,218 B1 | 7/2015 | Emigh | |
| 9,177,007 B2 * | 11/2015 | Winters | G06F 16/23 |
| 9,378,196 B1 * | 6/2016 | Tomkins | G06F 40/174 |
| 9,514,237 B2 * | 12/2016 | Burckart | G06F 16/958 |
| 9,747,598 B2 * | 8/2017 | Mogollon | G06Q 30/0601 |
| 9,781,132 B2 * | 10/2017 | Ramakrishnan | H04L 63/0823 |
| 10,013,411 B2 * | 7/2018 | Sherry | G06F 40/117 |
| 2005/0289114 A1 | 12/2005 | Bellamy | |
| 2014/0122988 A1 | 5/2014 | Eigner et al. | |
| 2015/0215305 A1 | 7/2015 | Wetzel et al. | |
| 2015/0288668 A1 | 10/2015 | Kupper et al. | |
| 2017/0249592 A1 | 8/2017 | Rossi et al. | |
| 2017/0262421 A1 | 9/2017 | Yue | |
| 2018/0341650 A1 | 11/2018 | Faith et al. | |

\* cited by examiner

AUTOMATIC FORM COMPLETION FROM A SET OF FEDERATED DATA PROVIDERS

BACKGROUND

The present application relates generally to computers and computer applications, and more particularly to computer-implemented form completion and authentication.

During various product or account application processes, applicants are required to provide information as well as verification of that information such as proof of age, income or address. This is usually done by including official supporting documentation from a trusted data custodian, such as a bank, along with the application. This documentation is difficult to authenticate and often exposes more information than is necessary to verify the information required to process the application.

BRIEF SUMMARY

A computer-implemented method, in one aspect, may include hosting an application form received from a service provider, the service provider having been authenticated by at least one data custodian of a set of data custodians, the application form including at least form fields to be populated with information. The method may also include receiving a user selection of the application form to be automatically populated, the user having been authenticated by at least one data custodian of the set of data custodians. The method may further include sending a data request to at least one data custodian of the set of data custodians for populating at least some of the form fields. The method may also include collating data received from said at least one data custodian. The method may further include populating said at least some of the form fields using the collated data. The method may also include returning the populated form fields to the service provider.

A system, in one aspect, may include a hardware processor. A memory device can be operatively coupled with the hardware processor. The hardware processor may be operable to host an application form received from a service provider, the service provider having been authenticated by at least one data custodian of a set of data custodians, the application form including at least form fields to be populated with information. The hardware processor may be further operable to receive a user selection of the application form to be automatically populated, the user having been authenticated by at least one data custodian of the set of data custodians. The hardware processor may be further operable to send a data request to at least one data custodian of the set of data custodians for populating at least some of the form fields. The hardware processor may be further operable to collate data received from said at least one data custodian. The hardware processor may be further operable to populate said at least some of the form fields using the collated data. The hardware processor may be further operable to return the populated form fields to the service provider.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The embodiments described herein may use the following terminologies by way of example.

Applicant: a user who wants to fill in an application form.

Service provider: an entity such as a company or organization offering a service and requiring an application form to be filled in with information.

Data custodians: the trusted companies that are already storing applicant information; examples of data custodians can include, but are not limited to, bank, medical aid, insurance company.

Router: a system that stores application forms and routing requests for data between service providers and data custodians. The router can also host application forms and provide a way for applicants to find, fill, and submit the application forms.

Necessary data: minimum required information to complete an application.

Coarse grained data: data provided in a bucket range or as a response to a yes/no question so as to provide only the minimum necessary data to complete an application.

Systems, methods and techniques may be provided, which can automatically complete application forms for products and/or services on behalf of an applicant, for example, by collating and verifying data from a set of federated data custodians. For instance, automatic application form completion from a set of federated data providers in a trustless environment can be provided. In an embodiment, the data is captured and verified (e.g., requiring physical presence) by a trusted data custodian (such as a bank), and provided in a coarse grained nature to prevent unnecessarily exposing information. In an embodiment, the data is also encrypted to ensure it is seen only by the service provider to whom the application form is intended. In this way, systems and methods in various embodiments can operate in a trustless environment.

In an embodiment, a method for automatic completion of application forms can include authenticating a service provider by a data custodian and hosting an application form for a product or service offered by the service provider on behalf of the service provider. The data custodian can be a pre-existing data custodian, for example, a bank. The method can also include authenticating an applicant, for example, by the data custodian, and allowing the applicant to select an application form to be automatically completed. The method can also include sending data requests to a federated set of trusted data custodians to obtain authenticated information about the applicant. Examples of the federated set of trusted data custodians include, but are not limited to, medical aid, bank, and insurance. The method can also include collating the data from the data custodians, and populating the application form. The data from the data custodians may be encrypted data. The method can also include allowing the applicant the opportunity to review the final populated form with the possible option of choosing among several alternatives, the option of adding information that does not need to be verified and the option of consenting to the form being sent. The method can also include returning or sending the completed application form to the service provider. The completed application form can be encrypted for sending to the service provider, which can then be decrypted and processed.

Figure 4:
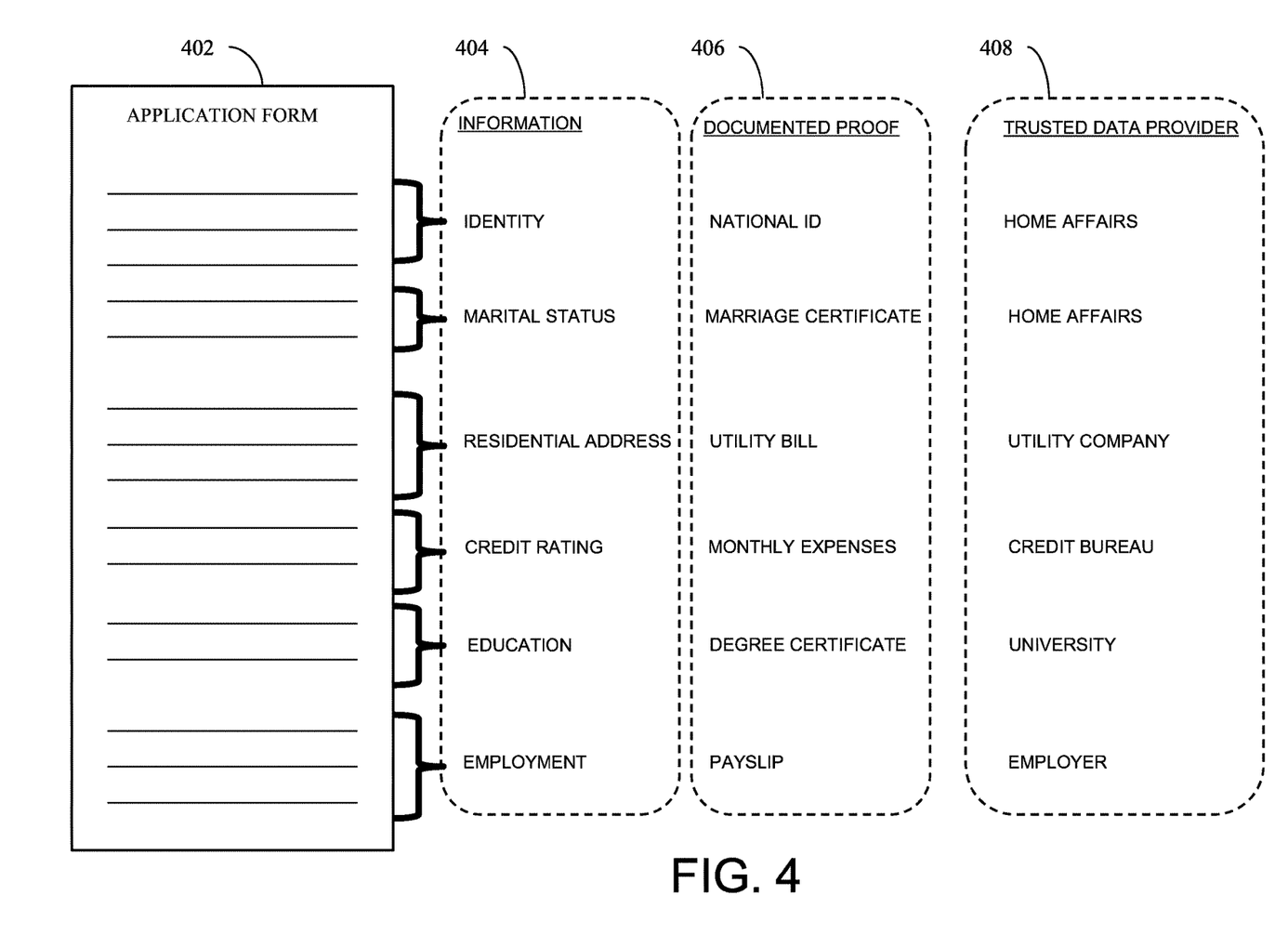
FIG. 4 is a diagram illustrating an example application form, information associated with a process of completing the form, and example data custodians which may hold information requested in the application form in one embodiment.

FIG. 4 is a diagram illustrating an example application form, information associated with a process of filling out the form, and example data custodians which may hold information requested in the application form in one embodiment. An applicant desiring a service from a service provider may need to complete an application form for the service. For instance, an application form 402 such as a residential loan application may request the applicant to enter information 404, some of which may include data to be kept secure, and which may also need proof of authenticity or verification. The service provider, for example, may request one or more supporting documents 406 to verify the entered information. However, it may be the case that one or more trusted data providers or data custodians 408 store some or all of the information for completing the application form. The system and/or method in embodiments can automatically complete the application by communicating with one or more trusted data custodians 406.

Figure 5:
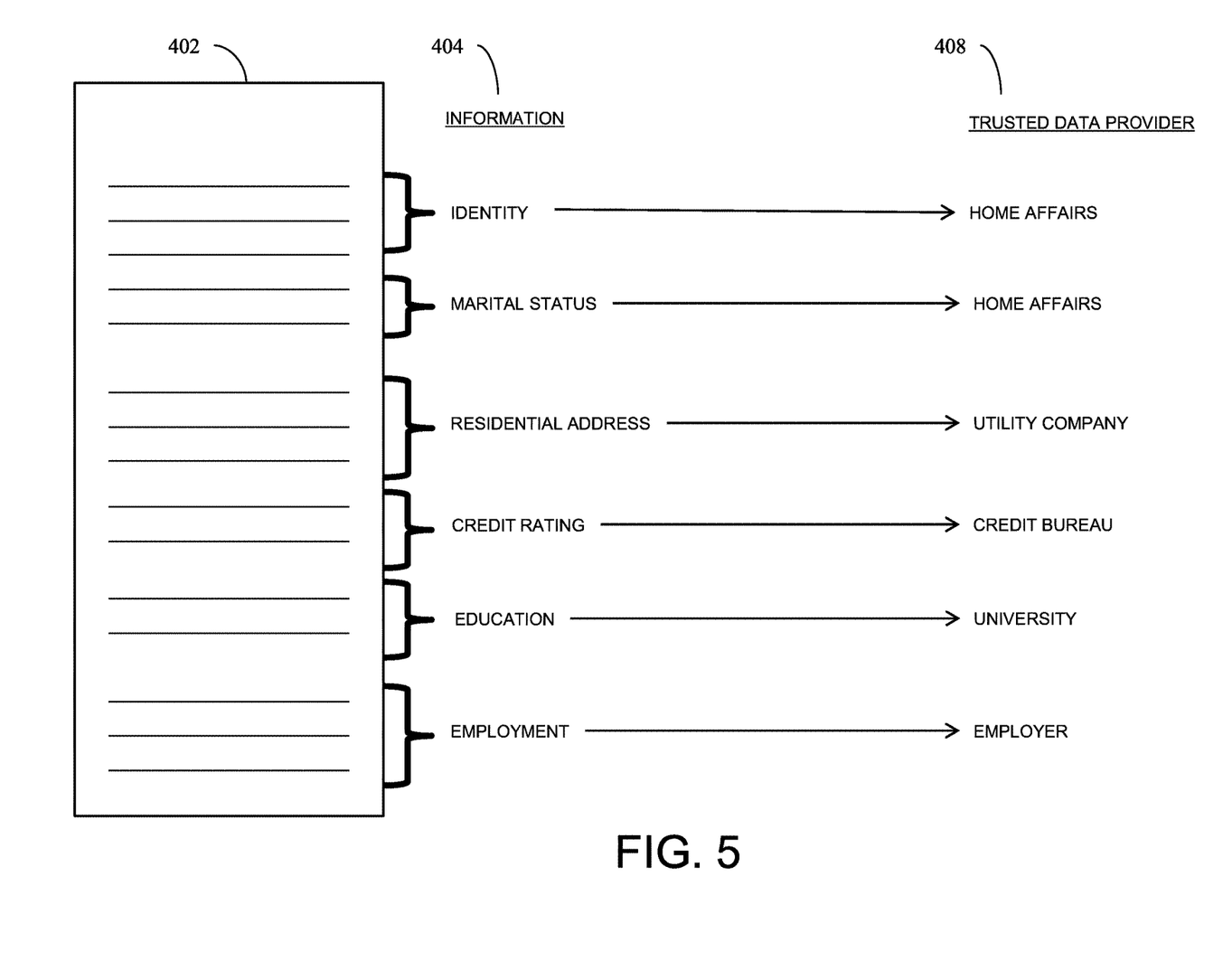
FIG. 5 is a diagram illustrating an example application form and data custodians from which the information can be obtained in one embodiment.

FIG. 5 is a diagram illustrating an example application form and data custodians from which the information can be obtained in one embodiment. The figure illustrates that information 404 requested in the application form 402 can be obtained from one or more trusted data providers or data custodians 408. In this way, the application form 402 can be automatically populated and the application submitted to the service provider (provided that a minimum requirement is met), for example, without having to provide document proof (406, FIG. 4).

An embodiment of a system according to the present disclosure may provide a mechanism of hosting application forms set up by service providers who have had their identity verified, for example, by a data custodian. Applicants wanting to submit an application to one of these parties can have the form automatically filled in by sourcing and verifying data fields from one or more trusted data custodians who will provide the information in a 'coarse grained' format so as to not expose any more information than is required for the application. For example, if the application form requires that the applicant is not a minor, the data custodian can verify that they are legally an adult without needing to divulge the applicants actual age. Furthermore the data can be encrypted by each data custodian in such a way (e.g., using asymmetric public-key cryptography) that it is only readable by the service provider requesting it.

An embodiment of a system according to the present disclosure may source information about an applicant from data custodians that already have the needed information, thereby not requiring the applicant to re-enter the data, and thereby avoiding exposing of applicant's data to a new organization or system, and avoiding redoing of the data verification, for example, in filling out an application form.

In various embodiments, the system and/or method according to the present disclosure can operate in a trustless environment. In working in a trustless environment, the system, for example, satisfies the following properties: The system does not share any secure information of the applicant with any party (other than the intended information with the intended service provider) that does not already have that information; The service provider receives the minimum information necessary for the purpose of evaluating an application; The verification of the applicant and service provider are performed using, or by, data custodians who already have reliable mechanisms to perform the verification, e.g., institutions such as banks that are subject to Know Your Client (KYC) which places stringent identity verification processes, making them trustworthy custodians of identity information.

The following illustrates an example use case. Consider an applicant applying for a home loan from a Home Loan Provider. This may involve the applicant fetching application forms, obtaining financial statements from a financial institution such as a bank, obtaining a certified copy of their identification (ID) document, and so on for all the other necessary documents in order to apply for the loan. Then the applicant fills in the form and then hands in the form and the supporting documents to the Home Loan Provider.

In this example scenario, the documents provided can be made visible to anyone within the Home Loan Provider, or anyone else who processes these documents, which may potentially expose the information and create compromising situations. In addition, collecting these documents, then processing them, can be time-consuming and labor intensive. Also, the Home Loan Provider may not be incentivized to only ask for minimum necessary data.

In an embodiment, the system may leverage data custodians to make the process faster, safer (e.g., from data being compromised), and more user information preserving (e.g., data protection). For instance, supporting documents need not be provided as information or data can be sourced directly from the data custodians. In an embodiment, the system may include a web application. Additionally, or in another embodiment, the system may include multiple applications running on devices, where there is a device at each data custodian, at each service provider, and with each applicant. These devices can be computers, smartphones, kiosks or other similar devices. The devices can be networked using a secure networking technology, such as Transport Layer Security (TLS) or another protocol or cryptographic protocol for secure communication over a computer network. The router can be a central computer running the routing application, which mediates the requests and data routing between the various parties in the system, and also manages user registration and authentication. The router may be embodied in a distributed fashion as a contract enforcing blockchain. Briefly, blockchain technology allows for managing digital transactions in a decentralized platform in a secure manner.

In an embodiment, the router can be implemented as a distributed application (D-app) in a blockchain. An example of a block-chain-based distributed computing platform includes Ethereum™. For example, the application form, applicant data and system access logs can be stored in the blockchain. The applicant data is encrypted with the service provider's public key before being stored on the blockchain to keep the data secure. The chain can ensure the transparency of how the router works (smart contract) and to make immutable the data and the meta data that was stored such as application date and whether it was received by the service provider, as well as what data was received from each data custodian. This mechanism can provide transparency, immutability and trust.

Figure 1:
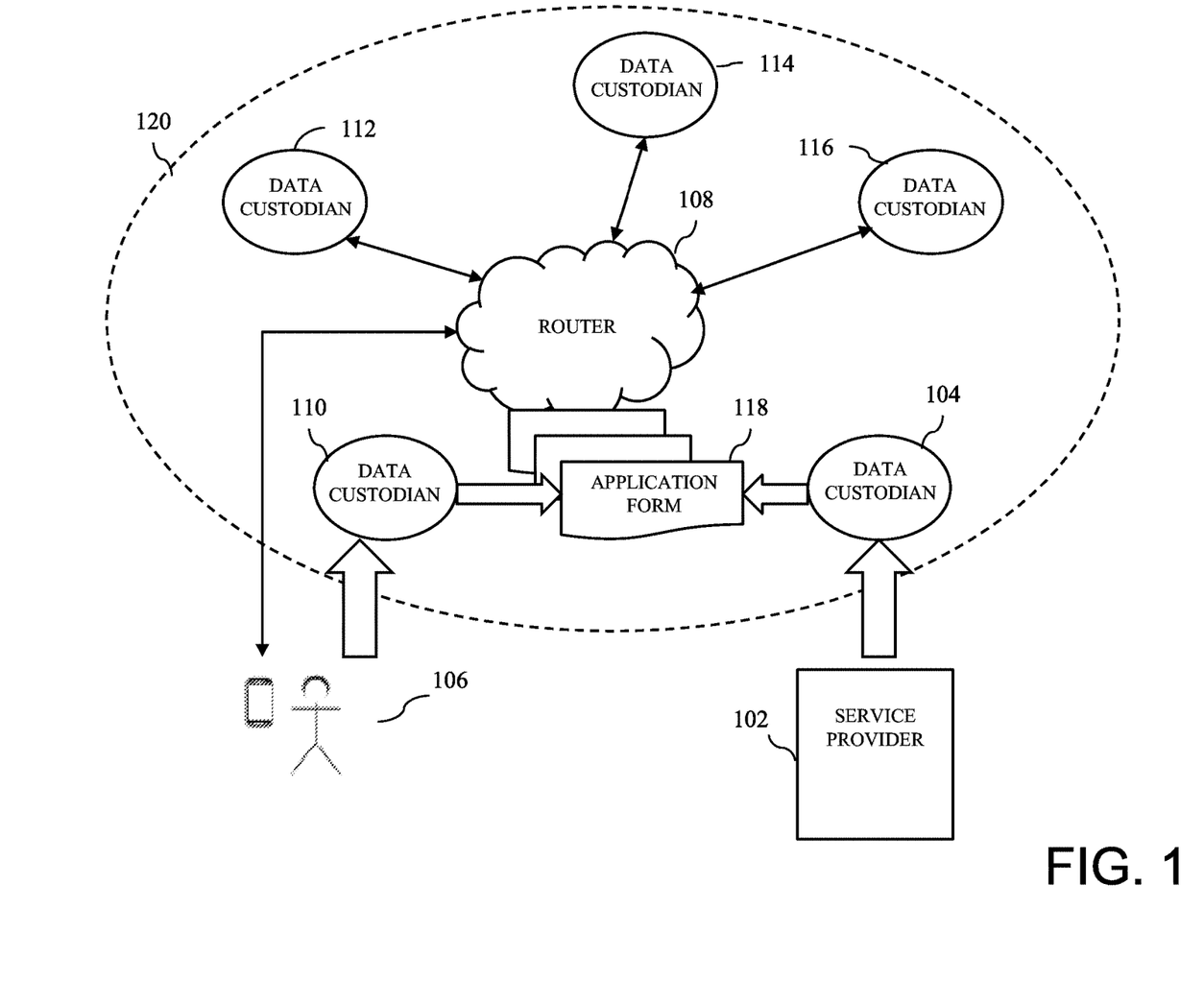
FIG. 1 illustrates components in a use case scenario in an embodiment.

FIG. 1 illustrates components in a use case scenario in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A service provider 102 such as a home loan provider 102 registers with a data custodian (such as Bank B) 104. For example, the home loan provider may have a business bank account with a bank 104 acting as the data custodian, in which case the data custodian (the bank) would have already verified the service provider 102. Similarly, an applicant 106 applying for a service such as a home loan from the service provider 102 (e.g., home loan provider) registers with a data custodian 110 (such as Bank A). During the registration process, both the service provider 102 and the applicant 106 are given a generated pair of public and private key. In an embodiment, an applicant's device (e.g., an app running on the applicant's device) may generate the private key. In another embodiment, a service provider's device may generate the private key. An app or web browser running on the service provider's hardware 102 that connects to the router 108 may generate the service provider's key. The applicant's device or the service provider's device protects the private key with a user-supplied password, and saves the encrypted version (which only the user can decrypt) on the router 108 for safe-keeping and recovery in a multi-device scenario.

The service provider (e.g., the home loan provider) 102 uploads their application form 118 to the router 108. The application form 118 is made public, and for each field in the form, the service provider 102 can provide a description of why that information is needed. The home loan provider's public key is attached to the form and is used to sign the form, proving authorship. For example, a home loan provider (or another service provider) may need data from verified sources in order to issue a home loan (or another service) to a user. The home loan provider (or another service provider) may verify its identify with a data custodian such as a bank, for example, at 104, and create a public application form which requires verified data.

The user 106 can connect to the router 108, and the router 108 may manage retrieval of form field data. For example, a user (e.g., the applicant 106) may want to apply for a home loan without providing unnecessary information to the home loan provider. The user (e.g., applicant) 106 wishing to apply for a home loan, logs into the router 108 and accesses the form 118. The user (e.g., the applicant 106) may verify the user's identify through an app or the like linked to a data custodian (e.g., a bank) 110 leveraging existing methods such as FICA and/or KYC. For example, the user may use FICA and KYC methods to authenticate the user at the time of opening the user's account with the data custodian such as a bank. Thereafter (e.g., when the user retrieves an application form), the user may authenticate the user on an app or browser using authentication methods such as password, or the like. This authentication may include two factor authentication.

By way of example, the user may sign in to the router 108 using the identity provided by a data custodian 110. Once the user's identity has been verified by the data custodian 110, the user can fill in the form directly on the router 108 or access the form on the router 108 via a portal inside the data custodian's app or website.

The user (e.g., the applicant 106) may select an application from a list of verified companies, e.g., stored in the router 108. For each field in the form, the applicant 116 is shown the reason why the information is needed, as well as the trusted data custodians that hold the data requested in the application form 104, 110, 112, 114, 116, e.g., all data custodians registered on the router, which have that specific piece of information about the applicant. In an embodiment, the components shown in 120 can be considered a circle of trusted data providers and data verifiers. For example, the data providers are part of a trusted group with pre-existing verification mechanisms, and therefore, the data can be trusted to be correct. By way of example, the trusted data custodian at 104 can be a bank (e.g., Bank B), the trusted data custodian at 110 can be another bank (e.g., Bank A), the trusted data custodian at 112 can be an insurance company, the trusted data custodian at 114 can be a medical aid, and the trusted data custodian at 116 can be a credit agency. The applicant 106 selects to fill in the name and ID fields from a data custodian 112, for example, as stored by that data custodian, for example, the applicant's insurance company. For the salary field, the applicant opts to fill in a salary range rather than actual salary, for example, by indicating on the form the option, which information can be received from another trusted source or data custodian (e.g., a bank). The applicant 106 can opt out of providing data associated with one or more fields, for example home address, if it is not clear why that field is needed. The router 108 can then ignore these fields. The applicant 106 may verify the applicant's information to be filled into form 118 by the router 108 by allowing the router to access the information stored by trusted a data custodian, for example, 110.

The router 108 then requests this information from each data source or data custodian (e.g., as selected by the applicant), and shows the filled-in form to the applicant. For instance, the router 108 may request coarse grained data from one or more trusted sources (data custodians, e.g., 112, 114, 116) to complete the application form. In an embodiment, the coarse grained data is encrypted with the service provider's (e.g., home loan provider's) 102 public key and returned. For instance, one or more data custodians may encrypt the data before sending the data to the router 108. If the applicant 106 is satisfied, the applicant can select to submit the form. The applicant 106 can also select to change the source or sources of information. One or more fields can be preprocessed or calculated before it is shown. For example, to respond to a questionnaire such as "is the applicant a minor?", the response can be calculated using the age of the applicant, which need not be communicated from its source or can be communicated in encrypted form only. For example, such calculation can be performed at the data custodian's device, prior to signing and encrypting. In another embodiment, the calculations may be executed on the router 108 in a "blind computation" form where the algorithm (from the service provider) and the data (from the data custodian) are hidden from the router by homomorphic encryption. Homomorphic encryption allows computation on encrypted data generating an encrypted result, which can be decrypted, for instance, only by the desired recipient. In an embodiment, the output is made visible only to the applicant 106 and service provider 102 with the applicant's consent.

Responsive to the applicant selecting to submit the form, the router 108 sends the form to the service provider 102, e.g., the home loan provider for processing. In an embodiment, to prevent the router 108 from accessing the applicant's information, the data used in the router 108 is encrypted by the data custodian using the applicant's public key. In an embodiment, when previewing the completed form for the applicant 106, the applicant's device decrypts the data using the applicant's private key. Similarly, in an embodiment, when submitting the form to the service provider 102, the applicant's device encrypts the data with the service provider's (e.g., home loan provider's) public key, and the encrypted data is then forwarded by the router 108 to the service provider (e.g., home loan provider) 102.

In an embodiment, to add trust to workings of the system, all the data provided by a data custodian is digitally signed by the data custodian, so that the service provider can be assured that the data is from a trusted source and has not been tampered with. Since the data custodian is legally bound to verify the data it stores (e.g., through acts like KYC and the Federal Insurance Contributions Act (FICA)), the service provider can immediately process the information and respond to the applicant as soon as it is processed, which can be nearly instantaneous when all the processing is done electronically.

In an embodiment, the system may formally facilitate the association of a piece of requested information with an associated justification and intended use. This can be done for every piece of requested information. The system may automatically summarize the association and/or score the association (e.g., by a security metric) for the applicant's perusal. For example, the router 108 may calculate the score responsive to the application form being created.

A regulatory authority would be able to ensure that legal data protection requirements are enforced by reviewing the information requested by the application forms and the supplied justification, to ensure it is compliant with law and even ensure that it is as coarse grained as possible.

In an embodiment, application forms can be augmented with arbitrary calculations on multiple data fields, for instance, to ensure that no data is shared until the minimum requirements are met. This way, the service provider need not learn any information if the minimum requirements are not met, not even which minimum requirement was not met. For example, when the application form is created, the service provider may create the calculations in the form of validation rules and saved alongside the application form. This can be in the form of an executable script, which can be executed at the data custodian's device, or executed at the router, for instance, using homomorphic encryption to protect the actual data. For example, if the applicant must meet a requirement to apply for a home loan and if the validation determines that the applicant does not meet the requirement, then the form would not be submitted. Similar validations can be created that encompass multiple fields.

In an embodiment, the arbitrary calculations can be performed in such a way as to keep the algorithms (e.g., of the service provider), the applicant's data and the result secret from all parties, on a need to know basis, including the entity that performs the computation (e.g., the data custodian or the router) using homomorphic computation. In an embodiment, the router does not see the actual value of the data, but an encrypted version of the data.

In an embodiment, the system does not need to collect user information from a user or store such information in a new database. Rather, information can be fetched in a secure manner at application time from trusted data providers.

Figure 2:
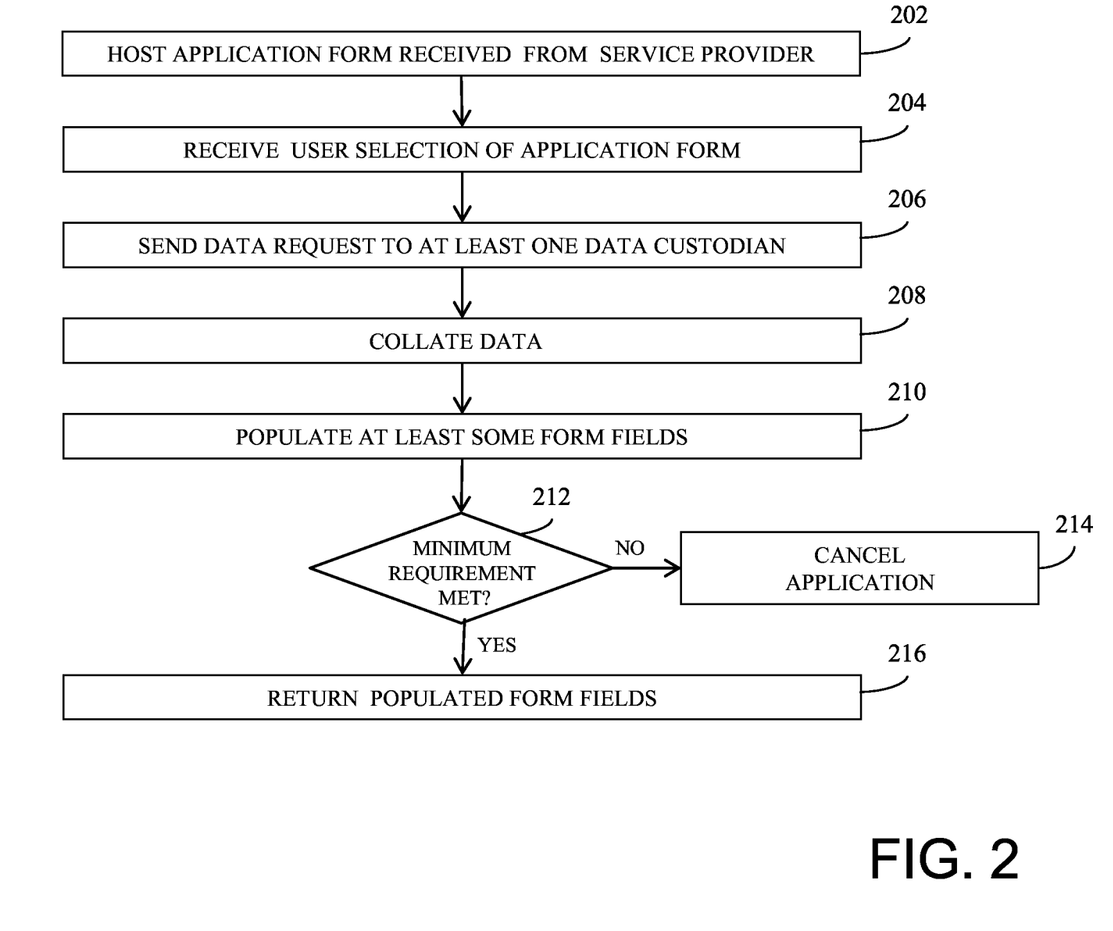
FIG. 2 is a flow diagram illustrating a method in an embodiment, of automatically completing a form in a secure manner.

FIG. 2 is a flow diagram illustrating a method in an embodiment, of automatically completing a form in a secure manner. The method can be executed by one or more hardware processors. At 202, the method includes hosting an application form received from a service provider. For example, a router device may host such an application form. The service provider is one that has been authenticated by at least one data custodian of a set of data custodians. The set of data custodians can include one or more data custodians, for example, a federated set of trusted data custodians. For instance, a pre-existing data custodian such as a bank may authenticate the service provider. The application form includes at least form fields to be populated with information, for example, user information.

In an embodiment, the application form can be digitally signed by the service provider that created it. For example, the service provider may encrypt the application form with the service provider's private key which can only be decrypted with the corresponding public key.

At 204, the method includes receiving a user selection of the application form to be automatically populated. The user, for example, has been authenticated by at least one data custodian of the set of data custodians. For example, a pre-existing data custodian such as an insurance company may have authenticated the user. The user may be then allowed to select an application form to be auto-completed.

At 206, the method includes sending a data request to at least one data custodian of the set of data custodians for data (e.g., authenticated information associated with the applicant or user) for populating at least some of the form fields. For example, data can be collected from a federated set of data providers, and for example, the same item of information from multiple providers can be verified, for example, compared. In an embodiment, the data may be received from one or more data custodians in a coarse grain format. For example, data may be in a range form, a category form or the like. By way of example, rather than a specific numeric data for specifying age, data may specify "above x", where x is a number. Providing or using data in coarse grained format can ensure only the minimum necessary information is returned, and for example, may prevent unnecessary leakage.

At 208, the method includes collating data received from at least one data custodian. For example, data from multiple data custodians can be combined together. For instance, each data custodian may only be able to provide some of the data fields. Some fields can be provided or verified by multiple data custodians. In such cases, duplicates which may occur can be removed.

At 210, the method includes populating at least some of the form fields using the collated data. At 212, it is determined whether minimum requirements met. If the minimum requirements are not met, the method includes canceling the application at 214. Otherwise, the method proceeds to 216.

At 216, the method includes returning or submitting the populated form fields to the service provider. For example, the router may return the filled-in or completed application form to the service provider. In an embodiment, the data of the applicant can be only seen by the intended service provider. For example, the data custodian providing the data can encrypt the data with the public key of the service provider which can only be decrypted by the private key of the service provider. In an embodiment, the data and any algorithm executed on the data can be hidden from all unauthorized parties, for example, by utilizing homomorphic computing. In an embodiment, the router can be implemented in a distributed manner such as a contract enforcing blockchain.

Figure 3:
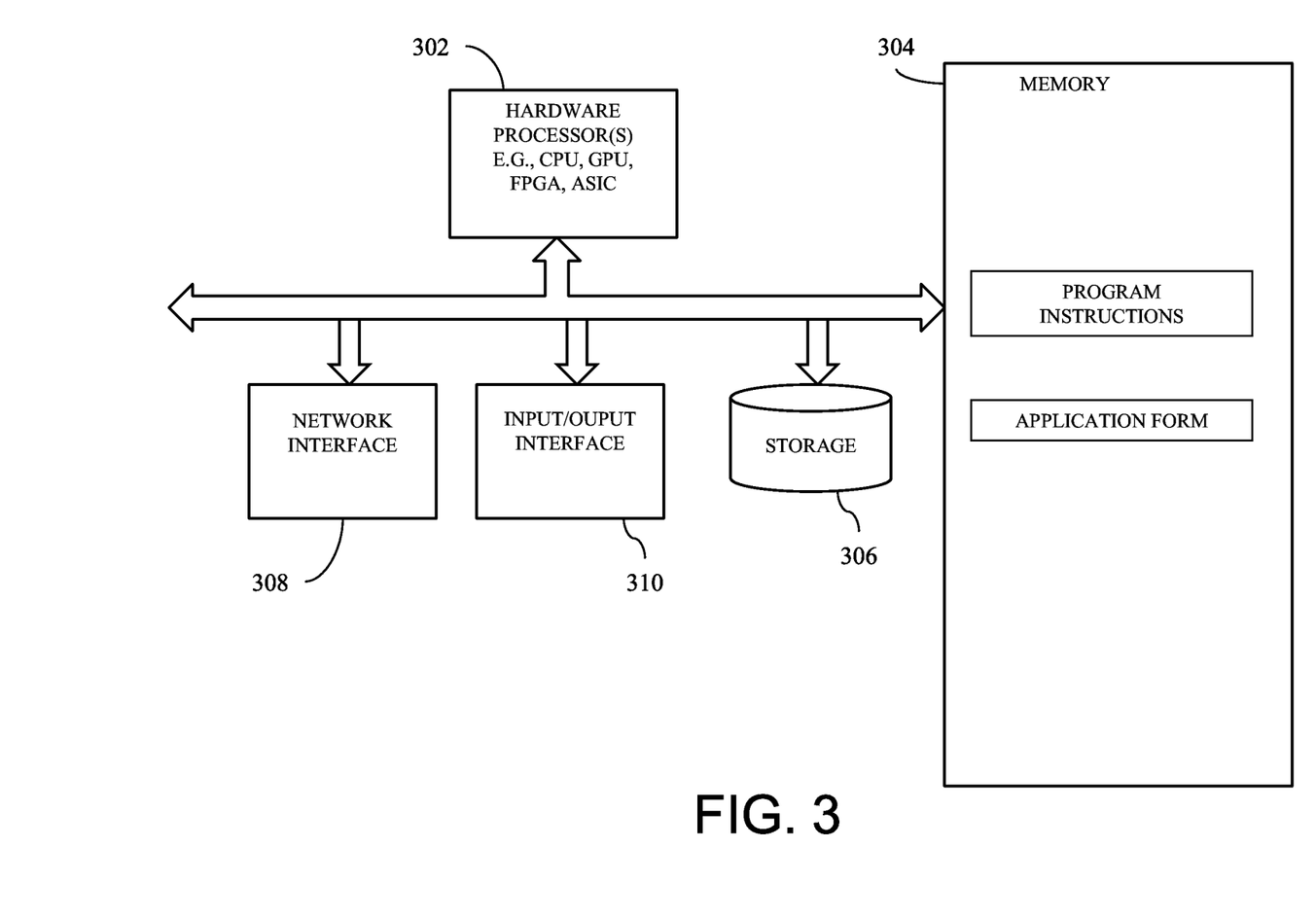
FIG. 3 is a diagram showing components of a system in an embodiment that can securely and automatically provide application form filling.

FIG. 3 is a diagram showing components of a system in an embodiment that can securely and automatically provide application form filling. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and host one or more application forms for one or more service providers (e.g., created or uploaded by one or more service providers), and automatically complete one or more form fields in a user selected application, for example, selected from one or more hosted applications. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. One or more hardware processors 302 may receive one or more application forms to host, receive user selected application form, and send data requests associated with filling in one or more form field entries in the selected application form. In an embodiment, hosted applications may be stored on a storage device 306 or received via a network interface 308 from a remote device, and may be temporarily loaded into a memory device 304 for automatic form filling. One or more algorithms may be stored on a memory device 304, for example, for execution by one or more hardware processors 302, for example, used in homomorphic processing. One or more hardware processors 302 may return a completed application form to a service provider with one or more details in coarse-grain format. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 6:
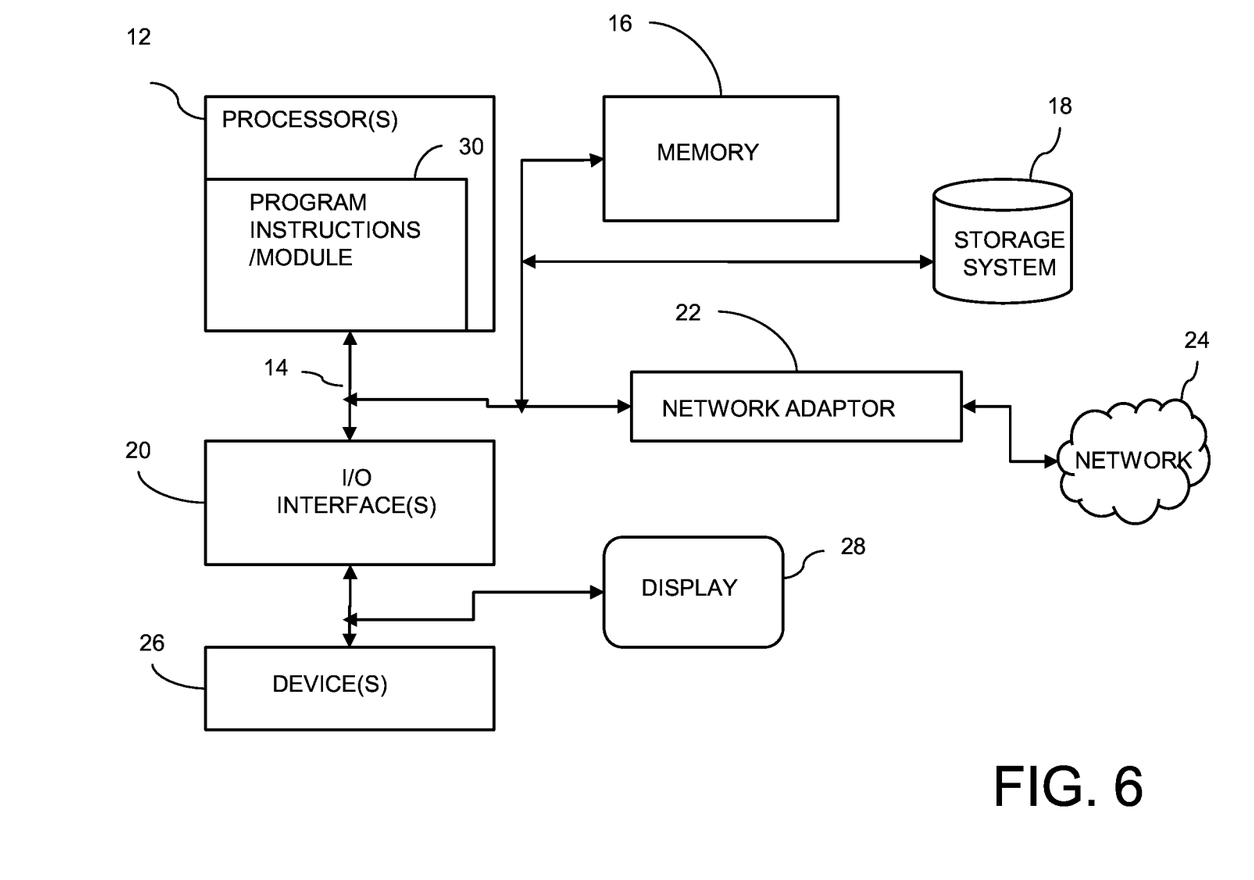
FIG. 6 illustrates a schematic of an example computer or processing system that may implement a system in an embodiment according to the present disclosure.

FIG. 6 illustrates a schematic of an example computer or processing system that may implement a system in an embodiment according to the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
    hosting an application form received from a service provider, the service provider having been authenticated by at least one data custodian of a set of data custodians, the application form including at least form fields to be populated with information;
    receiving a user selection of the application form to be automatically populated, the user having been authenticated by at least one data custodian of the set of data custodians;
    sending a data request to at least one data custodian of the set of data custodians for populating at least some of the form fields;
    receiving data from said at least one data custodian;
    collating the data received from said at least one data custodian;
    populating said at least some of the form fields using the collated data; and
    returning said at least some of the form fields, which are populated, to the service provider.

2. The method of claim 1, wherein the populating said at least some of the form fields using the collated data includes populating at least one of the form fields in a course grained format.

3. The method of claim 1, further including receiving the data from said at least one data custodian in a course grained format.

4. The method of claim 1, wherein the hosting an application form comprises:
    receiving a digitally signed application form from the service provider;
    storing the digitally signed application form on a memory device; and
    allowing the user to select the digitally signed application for automatic population of said at least some of the form fields.

5. The method of claim 1, wherein the data received from said at least one data custodian is encrypted data, which can be decrypted by the service provider.

6. The method of claim 1, wherein the data received from said at least one data custodian is encrypted by said at least one data custodian with the service provider's public key, which can be decrypted by the service provider with the service provider's private key.

7. The method of claim 1, further including using homomorphic computing in collating the data.

8. The method of claim 1, further including using homomorphic computing in populating said at least some of the form fields.

9. The method of claim 1, wherein the application form and the data are implemented as a blockchain.

10. A system comprising:
    a hardware processor;
    a memory device operatively coupled with the hardware processor;
    the hardware processor operable to at least:
        host an application form received from a service provider, the service provider having been authenticated by at least one data custodian of a set of data custodians, the application form including at least form fields to be populated with information;
        receive a user selection of the application form to be automatically populated, the user having been authenticated by at least one data custodian of the set of data custodians;
        send a data request to at least one data custodian of the set of data custodians for populating at least some of the form fields;
        receive data from said at least one data custodian;
        collate data received from said at least one data custodian;
        populate said at least some of the form fields using the collated data; and
        return said at least some of the form fields, which are populated, to the service provider.

11. The system of claim 10, wherein the hardware processor populates said at least some of the form fields in a course grained format.

12. The system of claim 10, wherein the hardware processor receives the data from said at least one data custodian in a course grained format.

13. The system of claim 10, wherein the hardware processor hosting the application form includes at least the hardware processor receiving a digitally signed application form from the service provider, storing the digitally signed application form on the memory device, and allowing the user to select the digitally signed application for automatic population of said at least some of the form fields.

14. The system of claim 10, wherein the data received from said at least one data custodian is encrypted data, which can be decrypted by the service provider.

15. The system of claim 10, wherein the data received from said at least one data custodian is encrypted by said at least one data custodian with the service provider's public key, which can be decrypted by the service provider with the service provider's private key.

16. The system of claim 10, wherein the hardware processor performs homomorphic computing in collating the data.

17. The system of claim 10, the hardware processor performs homomorphic computing in populating said at least some of the form fields.

18. A computer program product comprising a computer readable storage medium having program instructions embodied therewith, the program instructions executable by a device to cause the device to:
- host an application form received from a service provider, the service provider having been authenticated by at least one data custodian of a set of data custodians, the application form including at least form fields to be populated with information;
- receive a user selection of the application form to be automatically populated, the user having been authenticated by at least one data custodian of the set of data custodians;
- send a data request to at least one data custodian of the set of data custodians for populating at least some of the form fields;
- collate data received from said at least one data custodian;
- populate said at least some of the form fields using the collated data; and
- return said at least some of the form fields, which are populated, to the service provider.

19. The computer program product of claim 18, wherein the device is caused to populate said at least some of the form fields in a course grained format.

20. The computer program product of claim 18, wherein the data received from said at least one data custodian is encrypted by said at least one data custodian with the service provider's public key, which can be decrypted by the service provider with the service provider's private key.

* * * * *